(12) United States Patent
Franz et al.

(10) Patent No.: US 7,306,234 B2
(45) Date of Patent: Dec. 11, 2007

(54) OIL CONTROL RING FOR PISTONS OF INTERNAL COMBUSTION ENGINES

(75) Inventors: Holger Franz, Baltmannsweiler (DE); Martin Strauss, Stuttgart (DE)

(73) Assignee: Mahle GmbH, Stuttgart (DE)

( * ) Notice: Subject to any disclaimer, the term of this patent is extended or adjusted under 35 U.S.C. 154(b) by 0 days.

(21) Appl. No.: 10/578,121

(22) PCT Filed: Oct. 28, 2004

(86) PCT No.: PCT/DE2004/002397

§ 371 (c)(1),
(2), (4) Date: May 25, 2006

(87) PCT Pub. No.: WO2005/043013

PCT Pub. Date: May 12, 2005

(65) Prior Publication Data

US 2007/0080502 A1   Apr. 12, 2007

(30) Foreign Application Priority Data

Oct. 30, 2003   (DE) .............................. 103 50 567

(51) Int. Cl.
*F16J 9/12*     (2006.01)
*F02F 5/00*    (2006.01)
(52) U.S. Cl. .................. 277/460; 277/465; 277/472
(58) Field of Classification Search ............... 277/434, 277/437, 459, 460, 464, 465, 472
See application file for complete search history.

(56) References Cited

U.S. PATENT DOCUMENTS

| | | | |
|---|---|---|---|
| 1,499,571 A * | 7/1924 | Davis | .......................... 277/434 |
| 1,910,917 A * | 5/1933 | Harrington | .................. 277/445 |
| 1,999,494 A | 4/1935 | Zahodiakin | |
| 2,445,090 A | 7/1948 | Thompson | |
| 2,452,503 A | 10/1948 | Teetor | |
| 2,531,784 A * | 11/1950 | Pien | ........................... 277/464 |

(Continued)

FOREIGN PATENT DOCUMENTS

DE   1 104 276   4/1961

(Continued)

OTHER PUBLICATIONS

International Search Report.

*Primary Examiner*—Alison K Pickard
(74) *Attorney, Agent, or Firm*—Collard & Roe, P.C.

(57) ABSTRACT

The invention relates to an oil control ring for pistons of internal combustion engines. The aim of the invention is to provide an improved shape-adaptation capacity in comparison to prior art, with a tangential force that enables the ring to guarantee low friction and also low oil consumption during the operation of the engine. To achieve this, the inventive oil control ring comprises a solid bearing surface that lies against the cylinder wall, in addition to parallel ring flanks, between which a radial recess that runs around the periphery is configured in the rear of the ring, said recess being designed to receive a coil spring. The peripheral region of the ring flanks is provided with undulating end faces that face towards the rear of the ring. Said undulating end faces of the upper and lower ring flanks are offset out of phase with one another.

4 Claims, 1 Drawing Sheet

U.S. PATENT DOCUMENTS

Figure 1:
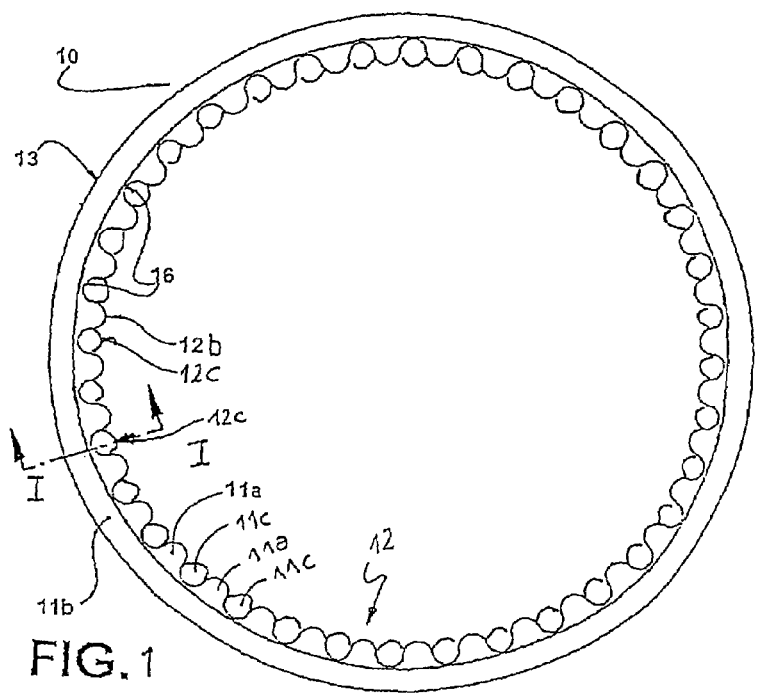

| | | | |
|---|---|---|---|
| 2,660,494 A | | 11/1953 | Olsen |
| 2,668,088 A | * | 2/1954 | Pien .......................... 277/472 |
| 4,371,174 A | * | 2/1983 | Gurtler ....................... 277/434 |
| 2004/0232623 A1 | * | 11/2004 | Panelli et al. ................ 277/459 |

FOREIGN PATENT DOCUMENTS

| | | |
|---|---|---|
| DE | 1 475 713 | 9/1969 |
| DE | 198 08 483 A1 | 9/1999 |
| DE | 100 41 803 A1 | 3/2002 |
| JP | 06185406 A | 7/1994 |
| JP | 06213071 A | 8/1994 |
| WO | WO/02 097310 A | 12/2002 |

* cited by examiner

OIL CONTROL RING FOR PISTONS OF INTERNAL COMBUSTION ENGINES

CROSS REFERENCE TO RELATED APPLICATIONS

Applicants claim priority under 35 U.S.C. § 119 of German Application No. DE 103 50 567.9 filed Oct. 30, 2003. Applicants also claim priority under 35 U.S.C. §365 of PCT/DE2004/002397 filed Oct. 28, 2004. The international application under PCT article 21(2) was not published in English.

The invention relates to an oil wiping ring for pistons of internal combustion engines, having a closed working surface that rests against the cylinder wall, as well as ring walls that lie parallel to one another, between which a radial recess for accommodating a helical spring, which recess runs over the circumference, is disposed in the center of the ring back, whereby the ring walls have face surfaces on the circumference side that are wave-shaped towards the ring back.

An oil wiping ring for internal combustion engines is known from DE 198 08 483 A1, in which slits are disposed, distributed over the circumference, in order to improve its flexibility, which slits extend axially through the entire ring cross-section and form oil outflow openings. A disadvantage in the case of oil wiping rings formed from sheet metal is the risk of garland formation as a result of the slits made in the ring.

Another embodiment of an oil wiping ring is known from DE 100 41 803 C2, in which the shape filling capacity of the ring is changed in order to increase the ring flexibility. Since the deciding influence factor for the shape filling capacity, aside from the tangential force, is the radial surface moment of inertia, which is known to depend on the third power of the radial wall thickness, mushroom-shaped recesses are provided in the case of the aforementioned DE, distributed over the circumference, which reduce the radial wall thickness, and extend exclusively from the inside of the ring, radially in the direction of the outer circumference surface. A disadvantage of this embodiment is the complicated formation of the recesses and their complicated production.

An oil wiping ring of the type stated is described in WO 02/097310 A1, which is provided with a closed ring working surface that rests against the cylinder wall, as well as with an upper and lower ring wall that run parallel to one another. Between the ring walls, in the center of the ring back, a radial recess that runs over the circumference, for accommodating a screw-shaped spring, is disposed, whereby on the circumference side, the ring walls have face surfaces that are shaped in wave form towards the ring back. A reduction in the shape filling capacity is achieved in the case of this embodiment, by means of the configuration of the wave-shaped face surfaces of the upper and lower ring wall, which are structured to have the same coverage. This means that at those locations where a wave peak is disposed on the upper face surface, a wave peak is also disposed on the lower face surface, whereby this arrangement, of course, also applies for the wave valleys.

In practice, however, it has been shown that the oil wiping ring does not work uniformly over its circumference, i.e. at those points where there is a wave valley, the ring makes contact, and at those points where there is a wave peak, the working surface of the oil wiping ring has no or only weak contact with the cylinder wall. In this final analysis, this results in increased oil consumption during engine operation. An increase in the tangential force of the oil wiping ring would result in more uniform contact, but an undesirable increase in the friction power would also occur.

It is the task of the invention to create an improved shape filling capacity, as compared with the state of the art, of an oil wiping ring for an internal combustion engine, with such a tangential force that the ring guarantees low friction power but also low oil consumption during engine operation.

This task is accomplished, according to the invention, by means of the invention, which provides a targeted geometrical arrangement of the wave-shaped face surfaces of the upper and lower ring wall, which are phase-shifted relative to one another, This ensures that uniform contact over the circumference of the working surface of the oil wiping ring, relative to the cylinder wall, is achieved. In addition, it was possible to reduce the oil consumption, because the oil that is wiped from the cylinder wall cannot more easily flow in the direction of the combustion chamber, directly by way of the wave valleys that act as flowthrough channels, as is the case when the face surfaces have a wave shape with the same coverage, but rather are prevented from doing so by means of a labyrinth that results from the phase offset of the face surfaces of upper and lower ring wall.

Practical embodiments of the invention are the subject of the dependent claims.

Figure 2:
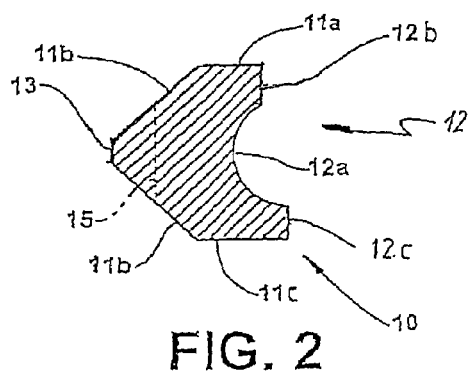
Figure 3:
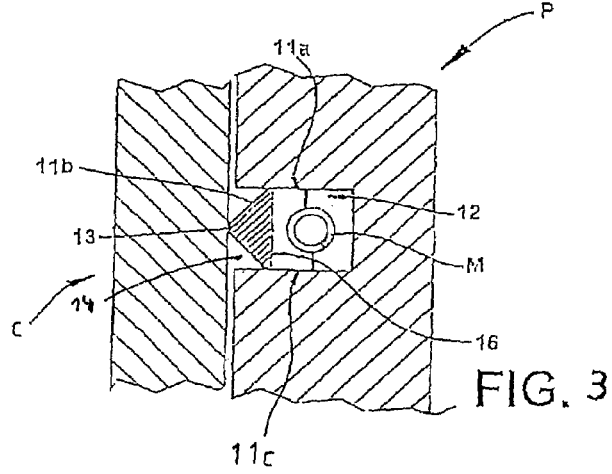

An exemplary embodiment of the invention will be described below, using the drawings. These show FIG. 1 a top view of the oil wiping ring according to the invention;

FIG. 2 a sectional view of the oil wiping ring along the line I-I from FIG. 1;

FIG. 3 a sectional view of the oil wiping ring in the piston/cylinder region of an internal combustion engine, along the line I-I from FIG. 1.

A one-piece oil wiping ring, indicated as 10 according to FIG. 2, has a working surface 13 followed by ring side walls 11b inclined in the axial direction, in each instance, which make a transition to ring walls oriented parallel to one another, an upper ring wall 11a and a lower ring wall 11c. In the ring back 12, a radial recess 12a for accommodating a screw-shaped spring M, which runs over the circumference of the oil wiping ring, is provided, as can be seen in FIG. 3. According to FIG. 3, the oil wiping ring 10 is disposed in a ring groove 14 of a piston P, in such a manner that its closed working surface 13 rests against the cylinder wall of a cylinder C.

According to FIG. 1, the upper and lower ring wall 11a and 11c have face surfaces 12b and 12c towards the ring back 12, which are configured in wave shape and run over the entire circumference of the oil wiping ring. According to the invention, the wave-shaped face surfaces 12b and 12c of the upper and lower ring wall are disposed phase-offset relative to one another, in such a manner that, viewed axially according to FIG. 1, the vertex of a wave peak of the upper ring wall 11a coincides with the vertex of a wave valley of the lower ring wall 11c—in other words a phase shift of preferably 180° occurs. Preferably, the wave-shaped configuration of the face edges 12b and 12c follows a sine function, but semi-circles that change direction by 180° and are lined up with one another, or V-shaped configuration shapes that are rounded off at their ends are also possible, so that the upper and lower oil pass-throughs indicated as 15 and 16 are formed accordingly. As already explained, this results in the advantage that the oil wiped from the cylinder wall cannot flow back in the direction of the combustion chamber, as the result of a labyrinth-like guidance of the oil.

It has furthermore been shown that a very good contact of the working surface 13 of the oil wiping ring 10 on the cylinder wall is also guaranteed by means of a phase shift that amounts to between 170° and 190°, whereby the number of waves of the upper and lower ring wall should preferably be the same, but also does not represent any restriction of the invention. A number of waves between 20 and 50 with reference to the circumference of the oil wiping ring 10 shows good results with regard to the contact behavior.

The face surfaces 12b and 12c of the upper and lower ring wall 11a, 11b show a wave amplitude, according to the invention, that corresponds to at least half the diameter of the screw-shaped spring M. In this way, the result is achieved that a specific tangential force of the oil wiping ring is achieved, which does not exceed an undesirable friction power. In this embodiment, the screw-shaped spring M rests against the root—in other words the vertex—of the radial recess 12a that runs over the circumference, without any interruption.

Production of the oil wiping ring can take place by means of powder metallurgy processes, such as pressing and sintering, by means of which shaping of the face surfaces 12b and 12c can be implemented in simple manner, without reworking. However, production of the oil wiping ring from sheet steel is also possible. Also, the embodiment according to the invention is not limited to such oil wiping rings as shown in FIGS. 4-6 of the reference WO 02/097310 A1 mentioned initially.

The invention claimed is:

1. Oil wiping ring (10) for pistons of internal combustion engines, having a closed working surface (13) that rests against the cylinder wall, as well as an upper and lower ring wall (11a, 11c) that run parallel to one another, between which a radial recess (12a) for accommodating a screw-shaped spring (M), which recess runs over the circumference, is disposed in the center of the ring back (12), whereby the ring walls (11a, 11c) have face surfaces (12b, 12c) on the circumference side that are wave-shaped following a sine function towards the ring back (12), wherein the wave-shaped face surfaces (12b, 12c) of the upper and lower ring wall follow a sine function phase-shifted relative to one another and have a wave amplitude that corresponds to at least half the diameter of the screw-shaped spring.

2. Oil wiping ring for pistons of internal combustion engines according to claim 1, wherein the phase shift amounts to 170° to 190°, preferably 180°.

3. Oil wiping ring for pistons of internal combustion engines according to claim 1, wherein the face surfaces (12b, 12c) of the upper and lower ring wall (11a, 11c) have a number of waves of 20 to 50 on the circumference.

4. Oil wiping ring for pistons of internal combustion engines according to claim 3, wherein the number of waves of the face surfaces (12b, 12c) of upper and lower ring wall is the same.

\* \* \* \* \*